US008220261B2

(12) United States Patent
Han

(10) Patent No.: US 8,220,261 B2
(45) Date of Patent: Jul. 17, 2012

(54) MASTER CYLINDER

(75) Inventor: Jin Han, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 580 days.

(21) Appl. No.: 12/466,224

(22) Filed: May 14, 2009

(65) Prior Publication Data

US 2010/0005797 A1 Jan. 14, 2010

(30) Foreign Application Priority Data

Jul. 8, 2008 (KR) ........................ 10-2008-0066033

(51) Int. Cl.
*B60T 11/28* (2006.01)

(52) U.S. Cl. ........................................................ 60/589

(58) Field of Classification Search ..................... 60/589
See application file for complete search history.

(56) References Cited

U.S. PATENT DOCUMENTS 7,086,229 B2 * 8/2006 Mallmann et al. .............. 60/589

FOREIGN PATENT DOCUMENTS

| | | | |
|---|---|---|---|
| JP | 05-178197 | A | 7/1993 |
| JP | 07-257355 | A | 10/1995 |
| JP | 2002-308083 | A | 10/2002 |
| KR | 1020020054430 | A | 7/2002 |
| KR | 1020040074176 | A | 8/2004 |
| KR | 1020060063088 | A | 6/2006 |

* cited by examiner

*Primary Examiner* — Michael Leslie

(74) *Attorney, Agent, or Firm* — Morgan, Lewis & Bockius LLP

(57) ABSTRACT

A master cylinder having at least one piston that pressurizes a hydraulic fluid when a stepping force on a brake pedal is transmitted thereto and sends the pressurized hydraulic fluid to at least a wheel cylinder. The piston includes a large diameter passage and a small diameter passage having a diameter smaller than that of the large diameter passage, and a valve body is fastened to the large diameter passage to control fluid communication between the large diameter passage and the small diameter passage, the valve body including a plunger coupling hole and a channel through which the hydraulic fluid communicates between the large diameter passage and the small diameter passage, wherein a plunger slidably passes the valve body through the plunger coupling hole and closes the channel of the valve body when the stepping force on the brake pedal is transmitted to the piston.

11 Claims, 3 Drawing Sheets

MASTER CYLINDER

CROSS-REFERENCE TO RELATED APPLICATION

The present application claims priority to Korean Patent Application Number 2008-0066033 filed on Jul. 8, 2008, the entire contents of which are incorporated herein for all purposes by this reference.

BACKGROUND OF THE INVENTION

1. Field of the Invention

The present invention relates to a master cylinder, and more particularly, to a brake master cylinder for vehicles, in which channel and sealing structures are improved.

2. Description of Related Art

In general, a hydraulic brake system generates a braking force by transmitting hydraulic pressure, which is generated by stepping on a brake pedal, to hydraulic brakes installed on front and rear wheels. This hydraulic brake system includes a booster increasing force when the brake pedal is applied, a hydraulic fluid reservoir storing a hydraulic fluid for forming hydraulic pressure, and a master cylinder transferring the hydraulic pressure to wheel cylinders in cooperation with the booster.

FIG. 1 is a cross-sectional view illustrating a conventional master cylinder before braking. FIG. 2 is a cross-sectional view illustrating a conventional master cylinder during braking. FIG. 3 is an enlarged cross-sectional view illustrating an important part of FIG. 2.

As illustrated in FIGS. 1 and 2, the conventional master cylinder includes a cylinder 10 having a blind end and first and second pistons 20 and 30 housed in the cylinder 10. The first and second pistons 20 and 30 are spaced apart from each other so as to be able to make relative motion.

A first boosting force transmission member 18 is interposed between an output shaft of the booster and the first piston 20. A second boosting force transmission member 19 is interposed between the first piston 20 and the second piston 30.

At this time, a space between the first piston 20 and the second piston 30 and a space between the second piston 30 and the blind end of the cylinder 10 serve as a first hydraulic chamber 21 and a second hydraulic chamber 31, respectively. The first and second hydraulic chambers 21 and 31 are provided with respective return springs 40 for returning the first and second pistons 20 and 30.

Further, the cylinder 10 is provided with first and second inlets 22 and 32 feeding a fluid into the master cylinder, and first and second outlets 23 and 33 transferring the fluid pressurized at the first and second hydraulic chambers 21 and 31 to the wheel cylinders. The first and second inlets 22 and 32 are connected with an oil tank.

Meanwhile, the first and second pistons 20 and 30 are equipped with first and second inflow chambers 24 and 34 in intermediate portions thereof in which the fluid introduced into the cylinder 10 through the first and second inlets 22 and 32 is stored before it is sent to the first and second hydraulic chambers 21 and 31. The first and second pistons 20 and 30 are provided with communication holes 50 in leading ends thereof which connect the first and second inflow chambers 24 and 34 with the first and second hydraulic chambers 21 and 31.

The communication holes 50 have center valves 60 installed therein so as to interrupt or allow the fluid that flows through the communication holes 50 to thereby close or open the first and second hydraulic chambers 21 and 31.

Each center valve 60 includes a valve body 62 and a sealing member 61 fitted around a leading end of the valve body 62. Each of the communication holes 50, which hold the respective center valves 60, includes a large diameter passage 51 holding the sealing member 61, and a small diameter passage 52 holding the remaining valve body 62 other than the sealing member 61.

The fluid flows through each communication hole 50, particularly a gap between the center valve 60 and the communication hole 50. In contrast, when the sealing member 61 comes into contact with a valve seat 53 formed by transition from the large diameter passage 51 to the small diameter passage 52, the fluid does not flow through each communication hole 50. To this end, the sealing member 61 held in the large diameter passage 51 is formed so as to have an outer diameter that is smaller than an inner diameter of the large diameter passage 51 and is greater than an inner diameter of the small diameter passage 52. Further, the inner diameter of the small diameter passage 52 is formed so as to be greater than an outer diameter of the valve body 62 held in the small diameter passage 52.

Meanwhile, in the rear of the respective center valves 60, cylinder pins 70 pass through the first and second inflow chambers 24 and 34 and are fixed to the cylinder 10. An elastic member 64 is installed in the large diameter passage 51 of each communication hole 50 so as to elastically support the corresponding center valve 60 toward the corresponding cylinder pin 70. The center valves 60 allow or block the flow of fluid through the communication holes 50 by interaction of the cylinder pins 70 and the elastic members 64 and by forward or backward movement of the first and second pistons 20 and 30.

Now, the operation of the conventional master cylinder will be described in detail.

When the brake pedal is applied for breakage, the first boosting force transmission member 18 is pushed by the output shaft of the booster, and thus the first piston 20 moves forwards. Then, the second boosting force transmission member 19 is pushed in cooperation with the first piston 20, and thus the second piston 30 also moves toward the blind end of the cylinder 10.

As the first and second pistons 20 and 30 move forwards, the center valves 60 moves along with the first and second pistons 20 and 30. As a result, as in FIG. 2, the valve bodies 62 of the center valves 60 are separated from the respective cylinder pins 70.

Further, when the valve bodies 62 of the center valves 60 are separated from the respective cylinder pins 70, i.e. are not supported on the respective cylinder pins 70, the elastic members 64 extend. Due to the extension of the elastic members 64, the center valves 60 are pushed in the communication holes 50 in a backward direction, so that the sealing members 61 come into close contact with the respective valve seats 53.

As a result, the flow of fluid through each communication hole 50 is interrupted, and thus the first and second hydraulic chambers 21 and 31 are closed. Afterwards, due to the continued movement of the first and second pistons 20 and 30, the fluid of each of the first and second hydraulic chambers 21 and 31 is pressed to move to the wheel cylinders.

When the breakage is released, the first and second pistons 20 and 30 are returned to their original positions by the return springs 40, and thereby the valve bodies 62 of the center valves 60 are supported on the cylinder pins 70 again as in FIG. 1.

In this state, the center valves 60 press the respective elastic members 64 in the front thereof, so that the elastic members 64 move forwards in the communication holes 50. Thereby, the sealing members 61 are separated from the respective valve seats 53, and thus the first and second hydraulic chambers 21 and 31 become open.

Meanwhile, this conventional master cylinder is used for applying the braking force to the wheels although the brake is not operated in a brake hydraulic control system, which is equipped with an anti-lock brake system (ABS) for preventing the wheels from locking during braking, a traction control system (TCS) for preventing the drive wheels from excessively slipping when abruptly starting off or accelerating, and an electronic stability program (ESP) for regulating a traveling direction of the vehicle in which a driver wants to go when the traveling direction of the vehicle is not identical to an actual traveling direction of the vehicle as a result of analyzing the state of the steering wheel.

In this manner, when the wheels slip regardless of the operation of the brake pedal, a hydraulic pump draws the fluid of the master cylinder through the first and second outlets 23 and 33, and then pressurizes the drawn fluid again so as to brake the wheels.

However, this conventional master cylinder has a problem in that, because a space where the fluid flows through the communication holes 50 is narrow, the fluid does not smoothly flow from the first and second inflow chambers 24 and 34 to the first and second outlets 23 and 33 through the communication holes 50 when the hydraulic pump draws the fluid of the master cylinder through the first and second outlets 23 and 33.

Further, as illustrated in FIG. 3, an edge 61 *a* of the sealing member 61 made of rubber is squeezed between the first piston 20 and the valve body 62 of the center valve 60, and thus the sealing member 61 is reduced in durability and sealing efficiency.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to provide a master cylinder capable of sufficiently securing a channel through which a hydraulic fluid flows and increasing durability of a sealing member.

In an aspect of the present invention, in a master cylinder having at least one piston that pressurizes a hydraulic fluid when a stepping force on a brake pedal is transmitted thereto and sends the pressurized hydraulic fluid to at least a wheel cylinder, the piston includes a large diameter passage and a small diameter passage having a diameter smaller than that of the large diameter passage, and a valve body is fastened to the large diameter passage to control fluid communication between the large diameter passage and the small diameter passage, the valve body including a plunger coupling hole and a channel through which the hydraulic fluid communicates between the large diameter passage and the small diameter passage, wherein a plunger slidably passes the valve body through the plunger coupling hole and closes the channel of the valve body when the stepping force on the brake pedal is transmitted to the piston.

The channel may be formed by at least a spoke extending from the plunger-coupling hole in a radial direction thereof.

The valve body may include a first sealing member disposed around outer surface of the valve body and configured to selectively seal the channel of the valve body and the plunger in the large diameter passage of the piston.

The valve body may further include a second sealing member protruding from the first sealing member to the large diameter passage and configured to seal the first sealing member and the large diameter passage of the piston.

The valve body may include a second sealing member protruding from outer surface of the valve body to the large diameter passage and configured to seal the valve body and the large diameter passage of the piston.

One end portion of the plunger slidably passing through the plunger coupling hole of the valve body and disposed in the small diameter passage may be coupled with an elastic member, which returns the plunger to close the channel of the valve body when the force stepping on the brake pedal disappears wherein the plunger includes a plunger body slidably passing through the plunger-coupling hole and coupled to the elastic member in the small diameter passage, and a channel open plate disposed in the large diameter passage to selectively close or open the channel of the valve body according to restoring force of the elastic member or the force stepping on the brake pedal.

The valve body may include a first sealing member disposed around outer surface of the valve body and configured to selectively seal the channel of the valve body and the channel open plate of the plunger in the large diameter passage of the piston, wherein the valve body further includes a second sealing member protruding from the first sealing member to the large diameter passage and configured to seal the first sealing member and the large diameter passage of the piston.

The valve body may include a second sealing member protruding from outer surface of the valve body to the large diameter passage and configured to seal the valve body and the large diameter passage of the piston.

The one end portion of the plunger may be coupled to the elastic member by an elastic member guide configured to extend integrally from rear end of the valve body in a longitudinal direction thereof in the small diameter passage so as to receive the elastic member thereon, the plunger coupling hole being formed through the valve body and the elastic member guide, wherein the plunger includes a plunger body movably passing through the plunger-coupling hole and coupled to the elastic member guide in the small diameter passage, and a channel open plate disposed in the large diameter passage to selectively close or open the channel of the valve body according to restoring force of the elastic member or the force stepping on the brake pedal.

The valve body may include a first sealing member disposed around outer surface of the valve body and configured to selectively seal the channel of the valve body and the channel open plate of the plunger in the large diameter passage of the piston, wherein the valve body further includes a second sealing member protruding from the first sealing member to the large diameter passage and configured to seal the first sealing member and the large diameter passage of the piston.

The valve body may include a second sealing member protruding from outer surface of the valve body to the large diameter passage and configured to seal the valve body and the large diameter passage of the piston.

The plunger body may include a guide coupler at an end portion thereof to receive an end of the elastic member guide therein.

The elastic member guide may have a protrusion protruding outwards from outer surface of the elastic member guide to retain the elastic member between the valve body and the protrusion and a catch coupled to the guide coupler of the plunger body.

The valve body may be elastic.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
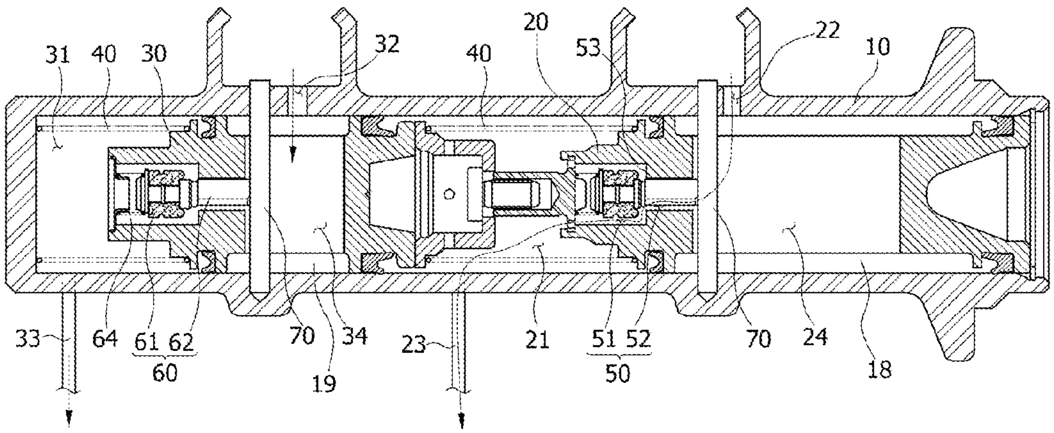
FIG. 1 (PRIOR ART)
FIG. 1 is a cross-sectional view illustrating a conventional master cylinder before braking.
Figure 2:
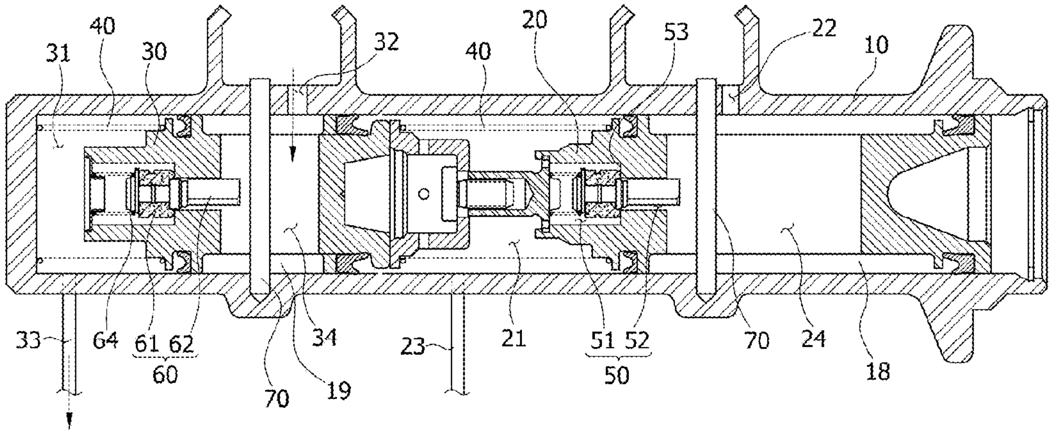
FIG. 2 (PRIOR ART)
FIG. 2 is a cross-sectional view illustrating a conventional master cylinder during braking.
Figure 3:
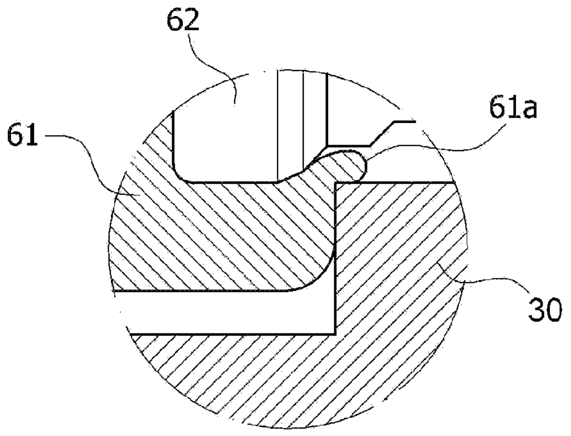
FIG. 3 (PRIOR ART)
FIG. 3 is an enlarged cross-sectional view illustrating an important part of FIG. 2.
Figure 4:
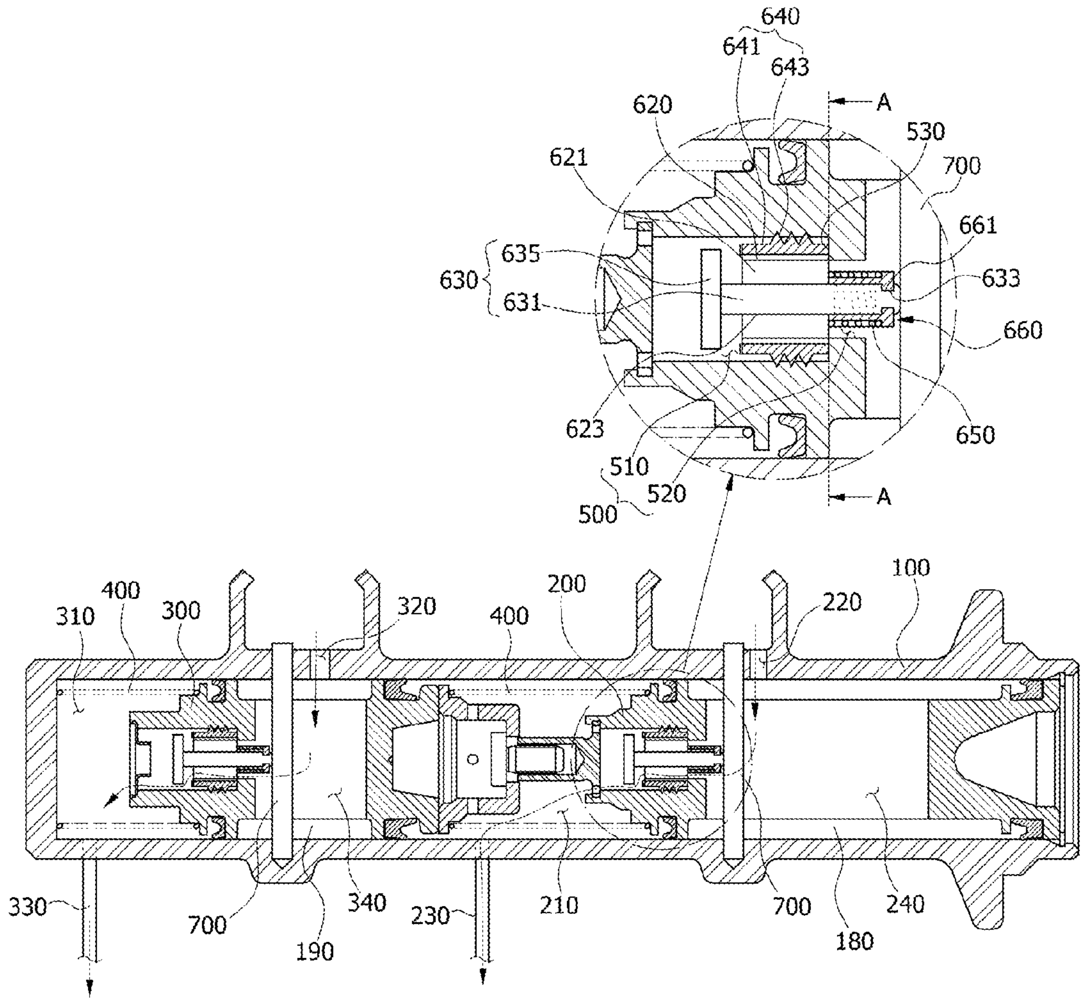
FIG. 4 is a cross-sectional view illustrating an exemplary master cylinder according to the present invention.
Figure 5:
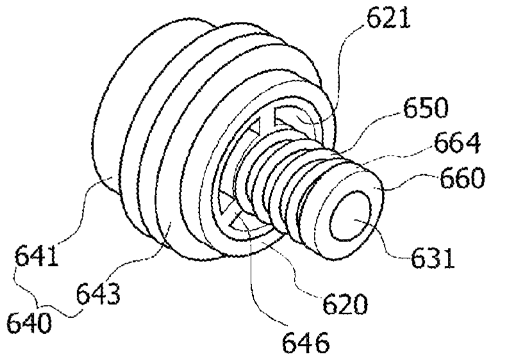
FIG. 5 is an enlarged perspective view illustrating a valve body of FIG. 4.
Figure 6:
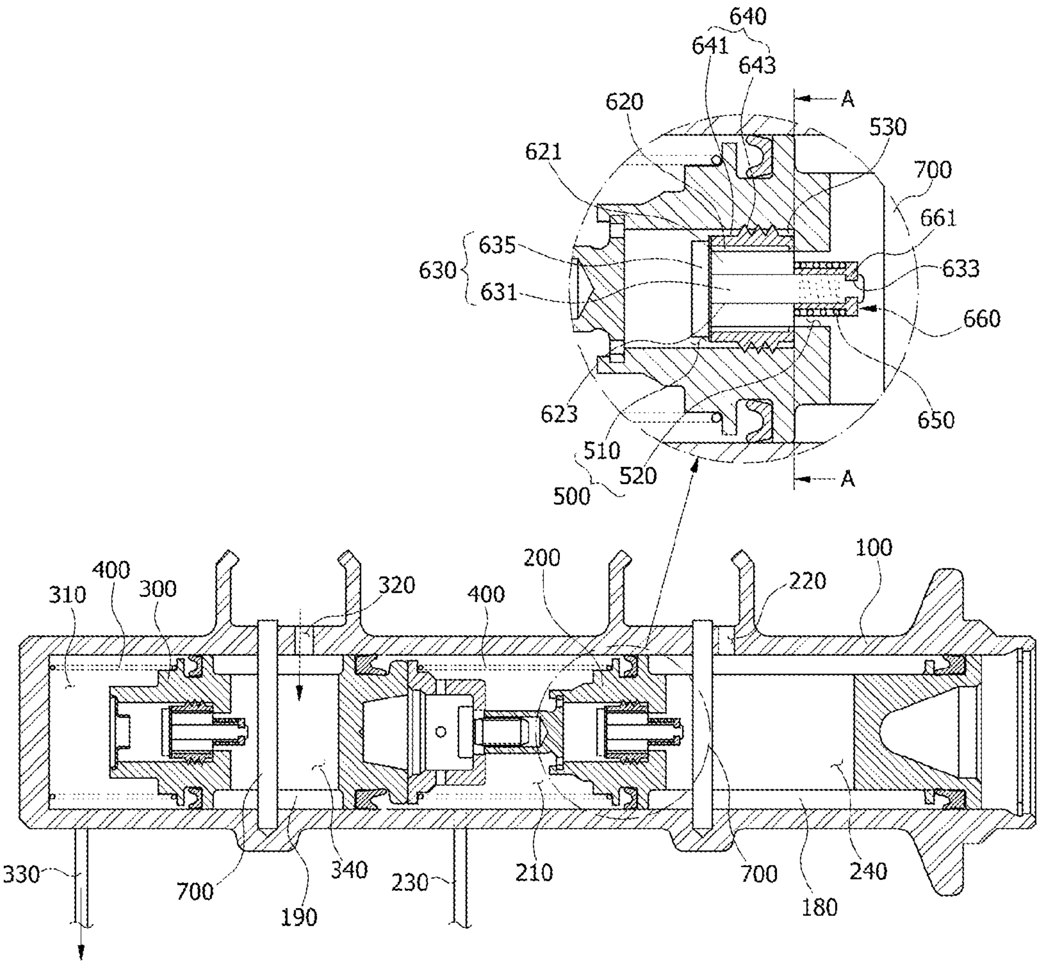
FIG. 6 is a cross-sectional view illustrating the state in which a braking force is generated from the master cylinder of FIG. 4.

FIG. 4 is a cross-sectional view illustrating a master cylinder according to an exemplary embodiment of the present invention. FIG. 5 is an enlarged perspective view illustrating a valve body of FIG. 4. FIG. 6 is a cross-sectional view illustrating the state in which a braking force is generated from the master cylinder of FIG. 4.

As illustrated in FIGS. 4 and 5, according to various embodiments of the present invention, the master cylinder includes a cylinder 100 having a blind end and first and second pistons 200 and 300 housed in the cylinder 100. The first and second pistons 200 and 300 are spaced apart from each other so as to be able to make relative motion.

A first boosting force transmission member 180 is interposed between an output shaft of the booster connected with a brake pedal and the first piston 200. A second boosting force transmission member 190 is interposed between the first piston 200 and the second piston 300.

At this time, a space between the first piston 200 and the second piston 300 and a space between the second piston 300 and the blind end of the cylinder 100 serve as a first hydraulic chamber 210 and a second hydraulic chamber 310, respectively. The first and second hydraulic chambers 210 and 310 are provided therein with respective return springs 400 for returning the first and second pistons 200 and 300 when breakage is released.

Further, the cylinder 100 is provided with first and second inlets 220 and 320, which feed a fluid into the cylinder 100, and first and second outlets 230 and 330, which transfer the fluid pressurized at the first and second hydraulic chambers 210 and 310 to wheel cylinders. The first and second inlets 220 and 320 are coupled with an oil tank.

Meanwhile, the first and second pistons 200 and 300 are equipped with first and second inflow chambers 240 and 340 in intermediate portions thereof in which the fluid introduced into the cylinder 100 through the first and second inlets 220 and 320 is stored before it is sent to the first and second hydraulic chambers 210 and 310. The first and second pistons 200 and 300 are provided with communication holes 500 which connect the first and second inflow chambers 240 and 340 with the first and second hydraulic chambers 210 and 310.

Hereinafter, a structure of the first piston 200 will be described, which is equally applied to a structure of the second piston 300.

The first piston 200 includes a stepped transition 530 in the inner circumference thereof. The communication hole 500 includes a large diameter passage 510 located in front of the transition 530, and a small diameter passage 520 located in the rear of the transition. The diameter of the small diameter passage 52 is smaller than that of the large diameter passage 51.

The large diameter passage 510 is equipped with a valve body 620 contacting the transition 530, a plunger 630 moving through the valve body 620 when hydraulic pressure is generated, a sealing member 640 installed on the outer circumference of the valve body 620, and an elastic member 650 installed on one end of the plunger 630 and returning the plunger 630 to a standby position when force stepping on the brake pedal disappears. The valve body 620 is fastened to the large diameter passage 510 of the first piston 200 so that the valve body 620 functions as a stationary member for the plunger 630 reciprocates therethrough.

Herein, the standby position refers to the state in which the hydraulic pressure is not formed in the first piston 200. A braking position refers to the state in which the hydraulic pressure is formed in the first piston 200, and thus a braking force is applied to the wheel cylinders.

As illustrated in FIGS. 4 and 5, the valve body 620 is provided therein a channel 621 through which a hydraulic fluid flows. In various embodiments of the present invention, the channel 621 may be formed by a plurality of spokes 646. The channel 621 is radially formed around a plunger-coupling hole 623 as the spokes 646 extends in radial direction from the plunger-coupling hole 623, thereby securing a maximum space through which the hydraulic fluid is to flow.

In various embodiments of the present invention, the plunger-coupling hole 623 may be formed in a central region of the valve body 620 so as to movably hold the plunger 630. The plunger-coupling hole 623 guides the plunger 630 such that the plunger 630 can stably move without fluctuation.

Further, the plunger 630 includes a plunger body 631 movably passing through the plunger-coupling hole 623 of the valve body 620, a guide coupler 633 installed on one end of the plunger body 631, and a channel open plate 635 installed on the other end of the plunger body 631 so as to open or close the channel 621 of the valve body 620.

The guide coupler 633 is coupled with an elastic member guide 660 guiding the elastic member 650. The guide coupler 633 is provided so as to correspond to a shape of the elastic member guide 660. According to various embodiments of the present invention, the guide coupler 633 is recessed such that the elastic member guide 660 is caught thereon.

The elastic member 650 is coupled to the elastic member guide 660 at one end thereof, and is supported by the valve body 620 at the other end thereof. This elastic member 650 is not limited to its shape as long as elastic force is produced, and can be configured in a variety of shapes such as a coil spring, a leaf spring, and so on.

The elastic member guide 660 is interposed between the plunger body 631 and the elastic member 650 so as to prevent the elastic member 650 from separating outwards. This elastic member guide 660 includes a catch 661 coupled to the guide coupler 633. Preferably, the catch 661 is forcibly coupled to the guide coupler 633 so as to be able to prevent separation of the elastic member 650. Furthermore the elastic member guide 660 includes a protrusion 664 so as to receive the elastic member 650 to prevent separation of the elastic member 650.

Meanwhile, the sealing member 640 enclosing the outer circumference of the valve body 620 includes a first sealing member 641 that slightly protrudes from the valve body 620 in a radial direction to selectively seal the channel open plate 635 and the valve body 620 and a plurality of second sealing members 643 that protrudes outwards from the first sealing member 641 in an annular shape in a radial direction to seal a gap between the first sealing member 641 and the large diameter passage 510.

Here, preferably, the outer diameter of each second sealing member 643 is somewhat greater than the inner diameter of the first piston 200 so as to improve sealing efficiency.

Since the channel open plate 635 is formed so as to correspond to the first sealing member 641, the channel 621 is open at a standby position where the channel open plate 635 is separated from the first sealing member 641, and thus the hydraulic fluid flows through the channel 621. In contrast, the channel 621 is closed at a braking position where the channel open plate 635 is in close contact with the first sealing member 641, and thus a sealed stated in which the hydraulic fluid does not flow through the channel 621 is maintained.

Various embodiments of the present invention may not include a sealing member 640 if the valve body 620 is elastic and sufficiently large enough to seal the large diameter passage 510 and thus the channel 621 can be further enlarged.

Other exemplary embodiments of the present invention may include one of the first and second sealing member 641 and 643 in case that the valve body 620 is elastic.

Now, the operation of the master cylinder as described above will be described below.

When the brake pedal is applied for breakage, the first boosting force transmission member 180 is pushed by the output shaft of the booster, and thus the first piston 200 moves forwards. Then, the second boosting force transmission member 190 is pushed in cooperation with the first piston 200, and thus the second piston 300 also moves toward the blind end of the cylinder 100.

The operation of the first piston 200 will be described below, which is equally applied to the operation of the second piston 300.

As the first piston 200 moves, the valve body 620 moves along with the first piston 200. As a result, the elastic member 650 compressed between the valve body 620 and the elastic member guide 660 extends, and thus the channel open plate 635 of the plunger 630 comes into close contact with the first sealing member 641 of the sealing member 640 as illustrated in FIG. 6. As the first piston 200 continues to move, the plunger body 631 is separated from the cylinder pin 700 and moves along with the first piston 200.

In this process, the flow of fluid through the communication hole 500 is interrupted, and thus the first hydraulic chamber 210 is closed. Afterwards, due to the continued movement of the first piston 200, the fluid of the first hydraulic chamber 210 is pressed to move to the wheel cylinders.

When the breakage is released, the first piston 200 is returned to its original position by the return spring 400. In this process, the plunger body 631 of the plunger 630 moving along the first piston 200 comes into contact with the cylinder pin 700. Then, the valve body 620, which moves in combination with the first piston 200, compresses the elastic member 650. Thereby, the elastic member 650 is compressed, so that the plunger body 631 is separated from the first sealing member 641 and the valve body 620, and thus the first hydraulic chamber 210 is open.

Meanwhile, this master cylinder according to various embodiments of the present invention may be used for applying the braking force to the wheels although the brake is not operated in a brake hydraulic control system, which is equipped with an anti-lock brake system (ABS) for preventing the wheels from locking during braking, a traction control system (TCS) for preventing the drive wheels from excessively slipping when abruptly starting off or accelerating, and an electronic stability program (ESP) for regulating a traveling direction of the vehicle in which a driver wants to go when the traveling direction of the vehicle is not identical to an actual traveling direction of the vehicle as a result of analyzing the state of the steering wheel.

In this manner, when the wheels slip regardless of the operation of the brake pedal, a hydraulic pump draws the fluid of the master cylinder through the first and second outlets 230 and 330, and then pressurizes the drawn fluid again so as to brake the wheels.

As described above, according to various embodiments of the present invention, the channel 621 are formed in the valve body 620, so that the channel 621 through which the hydraulic fluid flows can be sufficiently secured, and so that the sealing member 640 avoids being installed in the channel 621, and thus is increased in durability.

For convenience in explanation and accurate definition in the appended claims, the terms "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A master cylinder having at least one piston that pressurizes a hydraulic fluid when a stepping force on a brake pedal is transmitted thereto and sends the pressurized hydraulic fluid to at least a wheel cylinder, wherein:

the piston includes a large diameter passage and a small diameter passage having a diameter smaller than that of the large diameter passage; and a valve body is fastened to the large diameter passage to control fluid communication between the large diameter passage and the small diameter passage, the valve body including a plunger coupling hole and a channel through which the hydraulic fluid communicates between the large diameter passage and the small diameter passage;

wherein a plunger slidably passes the valve body through the plunger coupling hole and closes the channel of the valve body when the stepping force on the brake pedal is transmitted to the piston;

wherein an end portion of the plunger slidably passing through the plunger coupling hole of the valve body and disposed in the small diameter passage is coupled with an elastic member, which returns the plunger to close the channel of the valve body when the stepping force on the brake pedal disappears; and wherein the end portion of the plunger is coupled to the elastic member by an elastic member guide configured to extend toward a rear end of the valve body in a longitudinal direction thereof in the small diameter passage so as to receive the elastic member thereon, the plunger coupling hole being formed through the valve body and the elastic member guide.

2. The master cylinder according to claim 1, wherein the channel is formed by at least a spoke extending from the plunger-coupling hole in a radial direction thereof.

3. The master cylinder according to claim 1, wherein the valve body includes a second sealing member protruding from outer surface of the valve body to the large diameter passage and configured to seal the valve body and the large diameter passage of the piston.

4. The master cylinder according to claim 1, wherein the plunger includes:

a plunger body movably passing through the plunger-coupling hole and coupled to the elastic member guide in the small diameter passage; and a channel open plate disposed in the large diameter passage to selectively close or open the channel of the valve body according to restoring force of the elastic member or the force stepping on the brake pedal.

5. The master cylinder according to claim 4, wherein the valve body includes a first sealing member disposed around outer surface of the valve body and configured to selectively seal the channel of the valve body and the channel open plate of the plunger in the large diameter passage of the piston.

6. The master cylinder according to claim 5, wherein the valve body further includes a second sealing member protruding from the first sealing member to the large diameter passage and configured to seal the first sealing member and the large diameter passage of the piston.

7. The master cylinder according to claim 4, wherein the valve body includes a second sealing member protruding from outer surface of the valve body to the large diameter passage and configured to seal the valve body and the large diameter passage of the piston.

8. The master cylinder according to claim 4, wherein the plunger body includes a guide coupler at an end portion thereof to receive an end of the elastic member guide therein.

9. The master cylinder according to claim 8, wherein the elastic member guide has a protrusion protruding outwards from outer surface of the elastic member guide to retain the elastic member between the valve body and the protrusion and a catch coupled to the guide coupler of the plunger body.

10. The master cylinder according to claim 1, wherein the valve body is elastic.

11. A passenger vehicle comprising the master cylinder according to claim 1.

* * * * *